Nov. 15, 1966  J. E. BRUBAKER  3,285,821
NUCLEAR FUEL MODULE

Filed Sept. 16, 1965  3 Sheets-Sheet 1

INVENTOR.
BY  JAMES E. BRUBAKER

Nov. 15, 1966  J. E. BRUBAKER  3,285,821
NUCLEAR FUEL MODULE

Filed Sept. 16, 1965  3 Sheets-Sheet 2

INVENTOR.
JAMES E. BRUBAKER
BY

Nov. 15, 1966   J. E. BRUBAKER   3,285,821
NUCLEAR FUEL MODULE
Filed Sept. 16, 1965   3 Sheets-Sheet 3
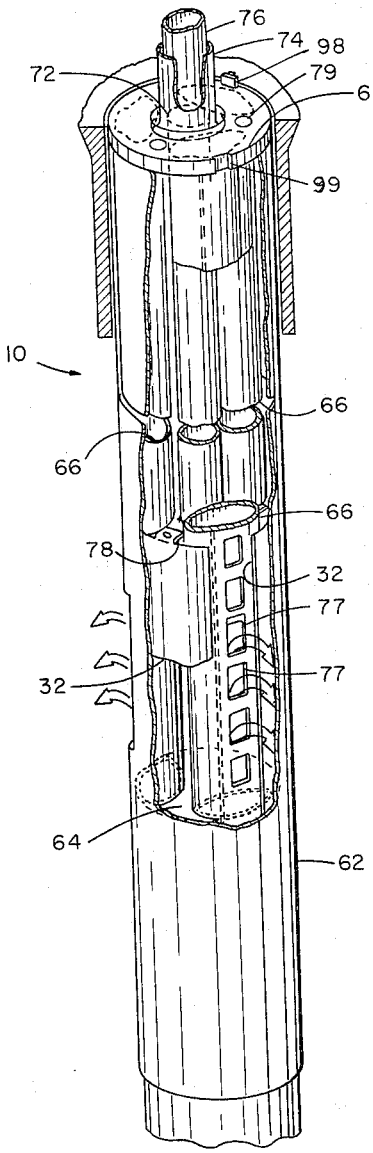
Fig. 5a
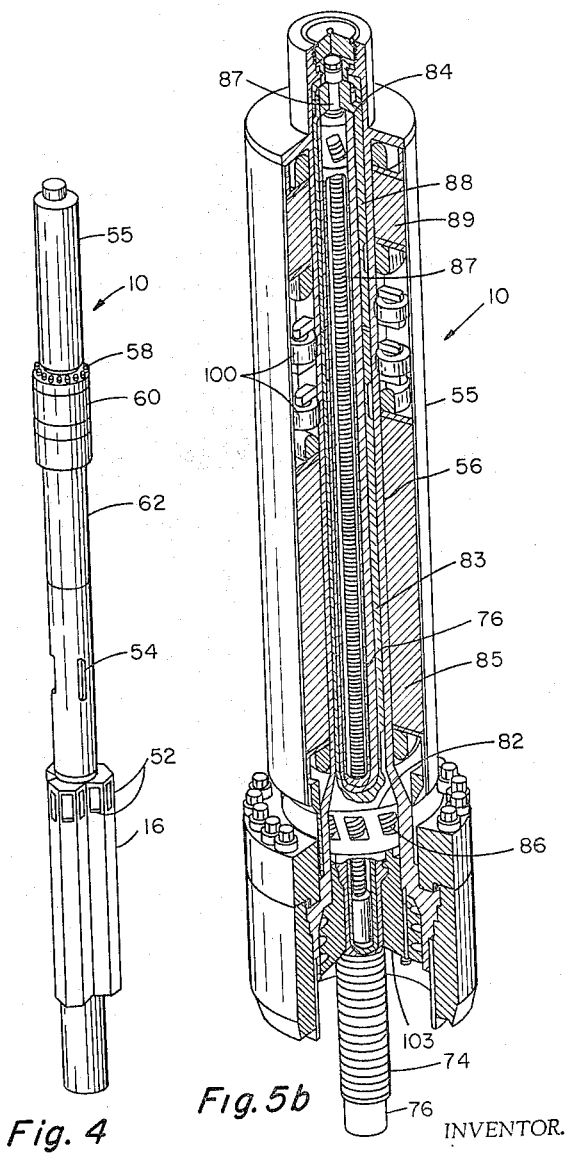
Fig. 4
Fig. 5b
INVENTOR.
BY JAMES E. BRUBAKER

United States Patent Office 3,285,821
Patented Nov. 15, 1966

3,285,821
NUCLEAR FUEL MODULE
James E. Brubaker, Pittsburgh, Pa., assignor, by mesne assignments, to the United States of America as represented by the United States Atomic Energy Commission
Filed Sept. 16, 1965, Ser. No. 487,941
5 Claims. (Cl. 176—29)

The present invention relates to a nuclear fuel module and more particularly to a nuclear fuel module incorporating a compact assembly of fuel, shutdown rod, and a dual control drive mechanism for the independent control of the fuel and shutdown rod.

In the Large Power Reactor (LPR) Program of the U.S. Atomic Energy Commission, a large (i.e., 500 mw.) seed-blanket reactor utilizing light water has been developed in which reactivity control over the reactor is accomplished by varying the seed geometry. In a seed-blanket reactor, relatively small seed regions of highly enriched fuel are surrounded by blankets of natural uranium or thorium. The blanket material is gradually converted to fissile material at a rate at least sufficient to make up for the depletion of the fissionable material in the seed regions, thereby extending the useful life of the core between loadings. In the method of reactivity control involving geometry regulation, leakage of neutrons from the small seed regions into the adjacent subcritical blanket regions is varied by moving portions of the seed to change its geometry rather than by using conventional parasitic neutron-absorbing poisons, although poison rods are used, as will be seen later, for shutting down the reactor. This variable geometry control, which is unique to the seed-blanket reactor concept, significantly enhances neutron economy. In addition, it essentially accomplishes, in a more effective but less complicated manner, the objectives sought by the spectral-shift concept of reactor control.

The purpose of this invention is to accomplish the purposes described above in such a way that the modules which are designed to vary the seed geometry, also contain the shutdown rod and its drive mechanism in a design of maximum reliability and minimum size and cost which also readily permits inspection, replacement and repair. Investigations made to determine the requirements for such an arrangement revealed that upward primary flow forces on the movable fuel assemblies would exceed the weight of the assemblies. Therefore, some reliable means would be required to counteract this force to insure fail-safe operation. Also, the high loads on the movable fuel could result in excessive wear of the mechanism bearings if not reduced in some manner. Further, it was found necessary to cope with the excessive impact energy of the movable fuel assembly during scram which could cause damage to the fuel rods, structure, and the drive mechanisms. Finally, there is the problem of insuring good alignment of the moving parts, adequate protection from cross flow forces, and freedom of motion for the shutdown rod between movable and stationary fuel assemblies.

In order to overcome all of these problems, and at the same time produce a fuel construction which is of economic and reliable construction, by this invention I have combined all of the above features in a module configuration of minimum size, complexity, and cost which is compatible with the core design of the Large Seed Blank Reactor (LSBR).

In accordance with the present invention, it has been made possible to obtain a fuel module incorporating all of the features and functions described above necessary to carry out the concept of the Large Seed Blanket Reactor with its unique method of reactivity control without sacrificing in any material respect any of its advantages.

The present invention embodies in the core of the reactor a plurality of fuel modules each of which comprises a stationary fuel assembly and a movable fuel assembly. This movable fuel assembly incorporates a shutdown rod which is located so as to be fully protected at all times from mechanical side forces and the effect of primary coolant flow. The relative movement of the fuel assemblies alters the geomery of the seed region so as to obtain the reactivity control desired. A counterweight in the movable fuel assembly may be used to overcome the net upward force on the fuel due to coolant flow and provides sufficient downward force to insure reliable downward motion under all flow conditions. Alternatively, hydraulic counterbalancing can be suitably located to provide the desired normal downward load on the movable fuel; this loading can be set at any selected value by proper design or adjustment of a special orifice. The counterweight or hydraulic balance piston is designed to also serve as a buffer for the movable fuel which slows the movable fuel at the lower end of its stroke to prevent excessive impacts.

A principal feature of this invention which permits the overall advantages of this fuel module is the use of special football shaped ducting, which forms the basis of the movable fuel module design. It permits independent operation of the movable fuel and shutdown rod and provides protection of the shutdown rod and its web from primary flow forces. It is also essential to the hydraulic balancing of the movable fuel if the balance piston concept is employed. It is essential to providing the necessary torque restraints for both control elements and is essential to the optimum design of the dual control drive mechanism. The movable fuel module which incorporates the important features of this invention is compact, readily removable, and provides convenient and reliable control.

It is thus a first object of this invention to provide an arrangement for altering the fuel geometry in a nuclear fuel assembly.

It is another object of this invention to provide a nuclear fuel module which incorporates a movable fuel assembly and a shutdown rod which are independently controllable.

It is a further object to provide a compact movable fuel assembly incorporating a shutdown rod both of which are free of excessive flow, torque and misalignment forces on the control elements.

Another object is to provide a simple reliable means to sense the position of both control elements within the module continuously during reactor operation.

Another object of this invention is to insure fail-safe operation of both control elements for all conditions of operation wherein interruption of power to the drive units will result in insertion (shutdown) of the control elements.

Another object is a movable nuclear fuel assembly of reliable design incorporating features of convenient replaceability.

A further object of this invention is to provide an arrangement for altering the fuel geometry in a reactor such that the primary flow forces acting on the movable fuel assemblies are counterbalanced to permit reactor shutdown.

Other objects and advantages of this invention will be readily apparent from the following description of a preferred embodiment of this invention taken with the accompaying drawings in which:

FIG. 4 is an isometric view of a typical fuel module constructed in accordance with this invention;

FIGS. 5a and 5b show cut-away regions of the movable fuel assembly incorporated in the module illustrated in FIGS. 1 and 3 to reveal the structural details of the preferred embodiment of this invention.

A selected design for the Large Seed Blanket Power Reactor is a light-water cooled seed-blanket converter-burner with a core capable of operating for about ten years without refueling. This reactor utilizes a seed fueled with uranium-235 and a blanket fueled with thorium-232. The thorium is converted into uranium-233 which is fissionable and this material is burned up in place without removal, taking the place of the uranium-235 depleted during this same period. In the core of this reactor, about one-half the total core energy is generated by the natural thorium blanket; about three-fourths of the initial enriched fuel charge would be depleted; and about three-fourths of the uranium-233 formed in the thorium blanket would be burned in place. Hence, it is apparent that this reactor can be operated for long periods of time without refueling, and that the costs of this reactor are not strongly dependent on reprocessing of spent fuel or on remote fabrication of radioactive fuel elements which ordinarily count materially in the costs of constructing and operating a power nuclear reactor.

An enhancing feature of the seed-blanket reactor is that it permits a method of reactivity control which, during normal operation, avoids the use of poison materials thereby conserving neutrons otherwise wasted by parasitic capture. This approach, already briefly described, makes it possible to control reactivity and enhance neutron efficiency by altering the relative position of portions of each seed.

This variable geometry control is rendered effective and useful by this invention which when used in clusters or groups forming a core of the reactor is capable of combining the movable fuel control, shutdown rod control, and other necessary characteristics which will carry out economically and reliably the reactivity control of the reactor as conceived.

Figure 1:
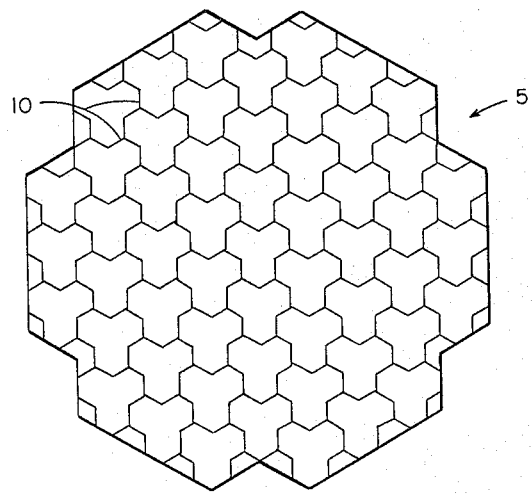
FIG. 1 shows a plan view of a core consisting of a cluster of the modules forming a preferred embodiment of this invention.
Figure 2:
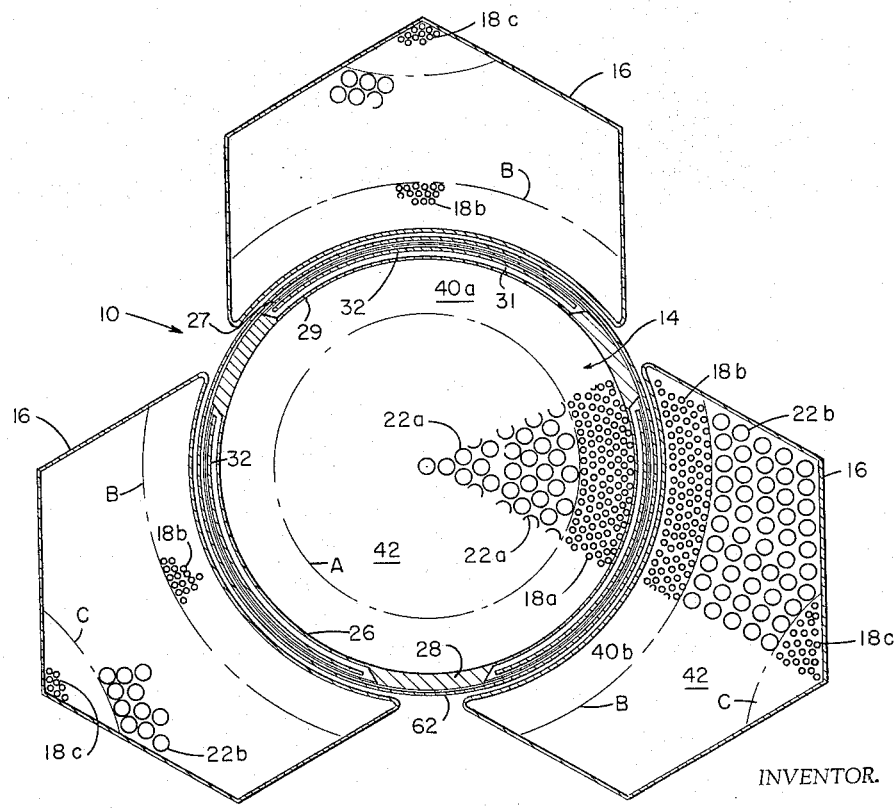
FIG. 2 is section plan view of a typical fuel module embodying the principles of this invention.

Referring to FIG. 1, there is shown a core 5 consisting of a cluster of fuel modules 10 representing a preferred embodiment of the invention which is more particularly shown in FIG. 2. Identical fuel assemblies 10 would dovetail together to form core 5 as illustrated in FIG. 1. Fuel module 10 consists of a movable round seed fuel assembly 14 surrounded by three chevron-shaped stationary fuel assemblies 16 which contain blanket fuel. Fuel assembly 14 is disposed within an outer guide tube 62 and includes a support member 26 which comprises two concentric tubular members 27 and 29 which are maintained in spaced relationship by three circumferentially spaced spacing members 28 thereby forming three circumferentially spaced shutdown rod channels 31 to accommodate shutdown rods 32. Tube 26 is filled with seed fuel elements 18a and blanket fuel elements 22a located in zones indicated by phantom line A as shown. Stationary or chevron-shaped fuel assemblies 16 contain blanket fuel elements 22b and seed fuel elements 18b and 18c located in zones separated as shown by phantom lines B and C. The seed zones are designated 40a and 40b while the blanket zones are designated 42.

Figure 3A:
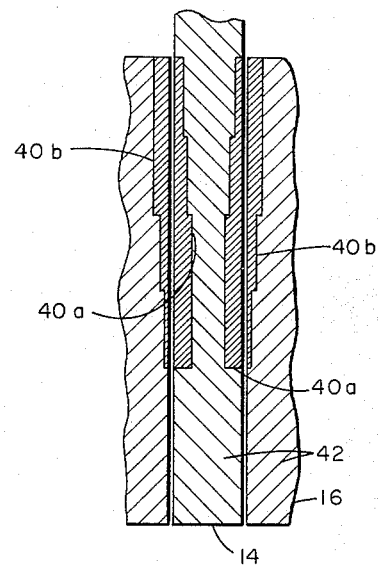
FIGS. 3a and 3b are schematic illustrations demonstrating the principle of variable seed geometry control incorporated in the preferred embodiment of this invention.
Figure 3B:
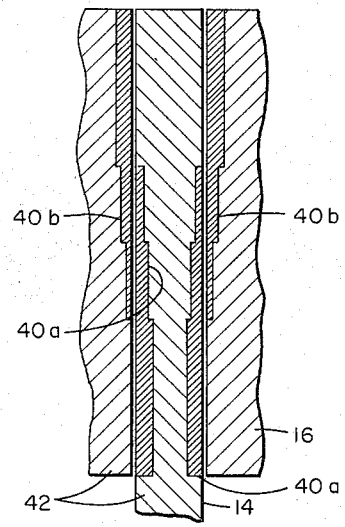

A schematic illustration of how the movement of fuel assembly 14 affects the reactivity of core 5 as shown in FIGS. 3a and 3b. In the low leakage geometry of FIG. 3a when core reactivity is the least, movable fuel assembly 14 is high relative to stationary fuel assemblies 16 so that the seed zones 40a and 40b are drawn together for lowest leakage and maximum reactivity. In FIG. 3b movable assembly 14 is lowered so that the seeded zones 40a and 40b are more separated for higher leakage and lower reactivity. Intermediate positions permit adjustments of reactivity as core reactivity levels change. Zones 42 represent the blanket fuel regions. Seed zones 40a and 40b contain seed fuel elements 18a, 18b and 18c, and blanket zones 42 contain blanket fuel elements 22a and 22b shown in FIG. 2.

The details of fuel module 10 constructed in accordance with this invention are shown in FIGS. 4, 5a and 5b. Module 10 is tubular in shape surrounded in the region of the core by the chevron fuel assemblies 16 previously described in connection with FIG. 2. Each chevron fuel assembly 16 has ports 52 for the exit flow of coolant while the portion of module 10 extending above assemblies 16 is provided with ports 54 for a similar purpose. The upper portion of module 10 is provided with a housing 55 containing a mechanism and having a motor tube 56 (FIG. 5b) therein which is bolted down and sealed to mechanism nozzle 60 through a flange 58. Nozzle 60 supports the main body or guide tube 62 of module 10 in the nuclear reactor in which it is situated.

For the details of the structure within module 10 in the region above chevron fuel assemblies 16, reference is made to FIGS. 5a and 5b. In FIG. 5a, showing a portion of module 10 immediately above chevron fuel assemblies 16, within the main body or guide tube 62 can be seen surface 64 of movable fuel assembly 14. Extending up from and secured to surface 64 of movable fuel assembly 14 are three somewhat elliptically or football shaped conduits or ducts 66 which terminate in a buffer plate 68. The vertical movement of the latter results in translation of the movable fuel assembly 14. At the lower end of each duct 66 is an opening in surface 64 which connects the interior of ducts 66 to the interior of support member 26 of fuel assembly 14. Buffer plate 68 is provided with a central opening 72 which is enclosed by a flanged tube 74 attached to plate 68 and extending upwardly as illustrated. As will be seen later, tube 74 effects the normal movement of buffer plate 68 and hence of movable fuel assembly 14. Passing through tube 74 and hole 72 of buffer plate 68 and moving independently thereof is a smaller tube 76 which terminates in the shutdown rod web arrangement consisting of three radial arms 78 each of which supports at its outer extremity a poison shut-down rod blade 32. Thus is is seen that shut-down rods 32 can be moved vertically within channels 31 independently of the movement of fuel assemblies 14.

High pressure coolant flows from shut-down rod channels 31 upwardly through openings 79 in buffer plate 68 and provides a high pressure region exterting a downward force on plate 68 and surface 64 which results in the desired net downward force on the movable fuel assembly in this embodiment of the invention employing the hydraulic balance piston concept. It will be appreciated that the pressure drop through shut-down channels 31 is less than the pressure drop through fuel elements 14, thereby resulting in a higher pressure being exerted downward on plate 68 and surface 64 than the coolant pressure acting upwardly on surface 64. The primary coolant flow through the movable fuel assembly 14 passes into the ducts 66. From ducts 66 coolant flows radially outwardly through openings 77 and 54 in ducts 66 and guide 62, respectively, as illustrated by the flow arrows in FIG. 5a.

Referring to FIG. 5b which shows a continuation of module 10 above that illustrated in FIG. 5a, it will be seen that tube 74 extends upwardly through a movable fuel roller nut 82 into housing 56. Tube 74 is threaded on the outside and is threadably engaged with toothed rollers 86 mounted in nut 82. Tube 76 also extends into housing 56. The upper end of tube 76 contains a shut-down rod roller nut 84. A thermal barrier member 103 is provided to limit reactor heat transmitted into housing 56. The positions of the movable fuel and shutdown rod are sensed by position indicators 100 which sense rotation (and hence translation) of each element. This arrangement permits replacement of the electrical stator and position indicator coils of both the movable fuel and shutdown rod drives without opening of the reactor pressure boundary as their housing 55 slips down over mechanism housing 56 which forms the pressure containment structure.

Drive for tubes 74 and 76 and hence fuel assembly 14 and shutdown rod blades 32 is exercised through roller nuts 82 and 84. Nut 82 forms the lower end of a movable fuel salient pole rotor 83 which rotates inside the pressure housing 56 under the magnetic torque of a low speed reluctance motor 85 which is located outside the pressure housing 56. Rotation of nut 82 results in translation of the movable fuel tube 74 since the latter is restrained from rotation via keys 98 and keyways 99 on the buffer plate 68 as seen in FIG. 5a. Deenergization of motor 85 results in lowering (rundown scram) of the movable fuel due to the net downward load. Buffer plate 68 operating in guide tube 62 limits velocity and resulting impact forces at the bottom of the movable fuel travel. An anti-ejection device (not shown) may be incorporated in the module to prevent unsignaled outward motion of the movable fuel.

The shutdown rod rotor 88 and leadscrew 87 are rotated in a similar manner by the reluctance stator 89 located outside the primary pressure boundary 56. Rotation of leadscrew 87 causes translation of nut 84 which is attached to the shutdown rod connector tube 76, and the shutdown rod blades 32 via the three arms 78. The three arms are prevented from rotating by the football-shaped conduits 66 of movable fuel assembly 14 which are, in turn, restrained from rotation by the keyways 99 previously described. Deenergization of the shutdown rod drive stator 89 results in lowering (rundown scram) of the shutdown rod (similar to that of the movable fuel).

In the arrangement described it will be noted that shutdown rod 32 can be moved independently of the movable fuel assemblies 14 by the selective or simultaneous energization of roller nuts 82 and 84 and is protected from side forces by being moved in its own channel 31 formed by the concentric tubular members 27 and 29 of tube 26. This minimizes the possibility of misalignment of flow jamming rods and permits the use of a relatively simple support arrangement for the shutdown rods.

In the operation of module 10, it is readily apparent that it is possible to remove each fuel assembly 14 from core 5, and since the shutdown rods and the drive mechanisms are contained completely within the assembly, all of the usual maintenance and repair procedures may be accomplished without disturbing the stationary portion of module 10. By the control of roller nuts 82 and 84, it is possible to alter the seed geometry selectively as desired, and in addition, insert or withdraw the shutdown rods at any time independently of the position of movable fuel assembly 14. Coolant flow upwardly through assembly 14 tends to counteract the load of the movable fuel thereby reducing the wear of the bearings supporting the load.

It is thus seen that there has been provided a compact arrangement of a nuclear fuel module incorporating an arrangement for controlling the reactivity of the reactor core and shutting down the reactor. All of the control elements and the movable members are contained with the assembly which is readily removable and replaceable, thereby simplifying problems of maintenance. In addition, it is seen that provision is made to minimize the normal operating loads on the movable fuel drive. The shutdown rod blades are protected from hydraulic flow and misalignment side forces by the scabbard arrangement provided.

While only a preferred embodiment of the invention has been described, it is understood that many variations may be made without departing from the principle of this invention and the invention is not to be limited thereby but is to be defined only by the scope of the appended claims.

I claim:
1. A nuclear fuel module comprising:
   (a) a movable fuel portion surrounded by a stationary fuel portion and forming spaces therebetween;
   (b) scabbards extending into said spaces for accommodating shutdown poison rods and protecting the latter from side forces acting thereon; and
   (c) a compact assembly directly above said movable fuel portion containing separate means for selectively and independently adjusting (1) the position of said movable fuel portion to affect the reactivity of said module and (2) the positions of said shutdown poison rods, each of said means including a low friction nut and threaded drive tube in cooperation with each other and means for inductively effecting the rotation of each said nut.

2. The nuclear fuel module of claim 1 in which one threaded drive screw connects a nut to said poison rods and another threaded drive screw connects the other nut to said movable fuel portion.

3. The nuclear fuel module of claim 2 in which buffer means connects the threaded drive screw to said movable fuel portion to prevent said movable fuel portion from being raised by coolant flow pressure and to slow downward movement to prevent excessive shock loads when reaching the bottom position of said movable fuel portion.

4. A nuclear fuel module comprising a movable fuel portion surrounded by a stationary fuel portion and forming spaces therebetween, buffer means positioned above said movable fuel portion and secured thereto, said movable fuel portion having first flow path means formed therein to conduct pressurized coolant fluid upwardly therethrough which exerts an upward force on said buffer means, and means formed on said module for exerting a downward force on said movable fuel portion exceeding the magnitude of said upward force exerted on said buffer means.

5. A nuclear fuel module comprising a movable fuel portion surrounded by a stationary fuel portion and forming spaces therebetween, buffer means positioned above said movable fuel portion and secured thereto, said movable fuel portion having first flow path means formed therein to conduct pressurized coolant fluid upwardly therethrough which exerts an upward force on said buffer means, bypass flow means formed in said module for conducting bypass fluid flow through said spaces to positions above said buffer means to exert a downward force on said buffer means, and said first flow path means being sized to have a higher pressure drop there-across than said bypass flow means whereby the net force exerted on said buffer means is in the downward direction.

References Cited by the Examiner

UNITED STATES PATENTS

| | | | |
|---|---|---|---|
| 2,982,710 | 5/1961 | Leyse et al. | 176—18 X |
| 3,151,029 | 9/1964 | Schwoerer | 176—28 X |
| 3,154,471 | 10/1964 | Radkowsky | 176—29 X |
| 3,162,796 | 12/1964 | Schreiber et al. | 176—36 |
| 3,219,535 | 11/1965 | Robbins | 176—29 X |

L. DEWAYNE RUTLEDGE, *Primary Examiner.*